(12) United States Patent
Sabev

(10) Patent No.: US 7,690,001 B2
(45) Date of Patent: Mar. 30, 2010

(54) SYSTEM AND METHOD FOR A MANAGEMENT MODEL EVENT SYSTEM

(75) Inventor: Hristo K. Sabev, Bourgas (BG)

(73) Assignee: SAP AG, Walldorf (DE)

( * ) Notice: Subject to any disclaimer, the term of this patent is extended or adjusted under 35 U.S.C. 154(b) by 1138 days.

(21) Appl. No.: 11/118,033

(22) Filed: Apr. 29, 2005

(65) Prior Publication Data
US 2006/0248503 A1 Nov. 2, 2006

(51) Int. Cl.
G06F 9/44 (2006.01)

(52) U.S. Cl. ........................ 719/318; 717/104

(58) Field of Classification Search .. 707/103 R–104.1; 717/104, 120–123; 719/318
See application file for complete search history.

(56) References Cited

U.S. PATENT DOCUMENTS

| | | | |
|---|---|---|---|
| 7,409,676 B2 * | 8/2008 | Agarwal et al. ............. | 717/120 |
| 7,434,229 B2 * | 10/2008 | Barinov et al. .............. | 719/318 |
| 2002/0026447 A1 * | 2/2002 | Matsutsuka et al. ...... | 707/103 Y |
| 2003/0226111 A1 * | 12/2003 | Wirts et al. ................. | 715/514 |
| 2004/0230973 A1 * | 11/2004 | Cundiff et al. ................. | 718/1 |
| 2006/0026552 A1 * | 2/2006 | Mazzitelli et al. ........... | 717/101 |

OTHER PUBLICATIONS

Murray, J., *Enhancing Application Manageability Part 1*, Jan. 19, 2004, pp. 1-7, http://dev2dev.bea.com/pub/a/2004/01/Murray.html.
Laessig, D., *Score big with JSR 77, the J2EE Management Specification*, Standardize J2EE server management with JSR 77, Jun. 14, 2002, pp. 1-9, http://www.javaworld.com/javaworld/jw-06-2002/jw-0614-mgmt_p.html.
Schaefer, A., ONJava.com, *Introducing A New Vendor-Neutral J2EE Management API*, Mar. 27, 2002, pp. 1-12, http://www.onjava.com/lpt/a/1522.
Hrasna, H., *Java™ Platform, Enterprise Edition Management Specification JSR-77*, Sun Microsystems, Inc., Jun. 18, 2002, pp. 214, http://jcp.org/jsr/detail/77.js-.

* cited by examiner

*Primary Examiner*—Li B Zhen
*Assistant Examiner*—Charles E Anya
(74) *Attorney, Agent, or Firm*—Schwegman, Lundberg & Woessner, P.A.

(57) ABSTRACT

An architecture for managing representations of objects. Each representation of an object corresponds to a regular object that is to be managed (i.e., an EJB). A model event system is utilized to receive and process external events and provide instructions on how these object representations. In one embodiment, the architecture adopts the JSR-77 specification for greater standardization and interoperability with existing systems and techniques.

15 Claims, 8 Drawing Sheets

SYSTEM AND METHOD FOR A MANAGEMENT MODEL EVENT SYSTEM

BACKGROUND

1. Field

This invention relates generally to the field of data processing systems. More particularly, the invention relates to a system and method for managing events.

2. Description of the Related Art

Multi-Tier Enterprise Application Systems

Traditional client-server systems employ a two-tiered architecture such as that illustrated in FIG. 1a. Applications 102 executed on the client side 100 of the two-tiered architecture are comprised of a monolithic set of program code including a graphical user interface component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1b. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1b may be implemented using a variety of different application technologies at each of the layers of the multi-tier architecture, including those based on the Java 2 Enterprise Edition™ ("J2EE") standard, the Microsoft .NET standard and/or the Advanced Business Application Programming ("ABAP") standard developed by SAP AG. For example, in a J2EE environment, the business layer 122, which handles the core business logic of the application, is comprised of Enterprise Java Bean ("EJB") components with support for EJB containers. Within a J2EE environment, the presentation layer 121 is responsible for generating servlets and Java Server Pages ("JSP") interpretable by different types of browsers at the user interface layer 120.

Java Management Extensions ("JMX")

In many modern computing systems and networks, including those described above which utilize complex, multi-tier architectures, monitoring of system resources and components is of significant importance to ensure not only the reliability and security of information flow, but also to promptly detect system deficiencies so that they are corrected in a timely manner. The Java Management Extensions ("JMX") specification defines an architecture for application and network management and monitoring in a J2EE environment. Using JMX, developers of Java technology-based applications can instrument Java platform code, create smart agents and managers in the Java programming language, and implement distributed management functionality into existing systems.

As illustrated in FIG. 2, the JMX architecture is divided into three levels: an "instrumentation" level 293; an "agent" level 202; and a "manager" level 201. At the instrumentation level 203, Java management beans ("MBeans") 210, 215 are used to manage manageable system resources 211, 216, respectively. A "manageable" resource is a resource that has been instrumented in accordance with the JMX instrumentation-level specification. By way of example, a manageable resource may include components of a business application, a device, or the implementation of a service or policy. MBeans 210, 215 are Java objects that represent the JMX manageable resources 211, 216.

An MBean server 205 at the agent level 202 is a registry for MBeans. A JMX "agent" is composed of an MBean server 205, a set of MBeans 210, 215 registered with the MBean server 205 (i.e., representing managed resources 211, 216), and one or more protocol adaptors and/or connectors 220. The MBean server 205 is a J2EE component which provides services that allow the manipulation of MBeans. All management operations performed on MBeans are performed via the MBean server 205.

The manager level 201 provides management components that can operate as a manager or agent for distribution and consolidation of management services. Different management interfaces may be employed at the management level such as Web Browsers 230 and/or proprietary management applications 231, 235. JMX managers 232 implemented within the manager level 201 provide an interface for management applications to interact with the agent, distribute or consolidate management information, and provide security.

A detailed description of the JMX specification can be found on the Sun Website which is, as of the time of this writing, http://java.sun.com/products/JavaManagement/ (currently version 1.5 Reference Implementation).

Java Specification Request 77 (JSR-77)—J2EE Management Model

JMX enables Java developers to provide a management interface which can then incorporated into a management tool. However, JMX does not specify a management model that defines the management information that can be exchanged and the underlying semantics of that information. JSR-77 provides such a management model for the J2EE platform.

JSR-77 provides a model of how the data is presented to the client. The model describes how the data is grouped together into objects and how the objects are related to each other. The model supports the ability to manage a number of J2EE resources including EJBs, web containers, Java Messaging Service ("JMS"), and Java Database Connectivity ("JDBC") connections through managed object models for each.

JSR-77 does not provide Java classes for its implementations (with some exceptions). Since JSR-77 does not provide classes, the traditional meaning of the term object is generally not associated with these managed Java instances. Instead the term object describes a group of information representing a logical object, a managed object model, of the J2EE server. Accordingly, a system implementing JSR-77 does not have to represent physical objects.

FIG. 3 illustrates the major elements of JSR-77. These elements include managed objects 301 (JSR 77.3), events 303 (JSR 77.5), state management 305 (JSR 77.5), performance monitoring 307 (JSR 77.5). Each managed object must have common attributes from a base model ("J2EEManagedObject model"). These attributes include OBJECT_NAME object name, Boolean stateManageable, Boolean statisticsProvider, Boolean eventProvider, String deploymentDescriptor, OBJECT_NAME server, and OBJECT_NAME[ ] modules.

If any of the Boolean attributes is true, then the managed object includes additional required attributes and operations of the respective models. The attribute stateManageable means that the object provides additional operations to start and stop its services; statisticsProvider means that the object can provide runtime statistics; and eventProvider means that the object enables a client to register for evens and receive event notification.

Additionally, JSR-77 provides for an inheritance hierarchy as depicted in FIG. 4. All managed objects build from the attributes of the J2EEManagedObject model 401. For example, EJB 403 includes the attributes of the J2EEManagedObject model 401 as does JVM 405. The Session Bean 407 further inherits the characteristics of EJB 403, etc.

The complete specification of JSR-77, developed through the Java Community Process and beyond the scope of this document, can be found on the Sun Website which is, as of the time of this writing, http://java.sun.com/j2ee/tools/management/.

SUMMARY

One embodiment of the invention employs techniques for managing object representations in a model domain. Each object representation corresponds to a normal object that is to be managed (i.e., an EJB). In one embodiment, the model domain adheres to the JSR-77 specification for greater standardization and interoperability with existing systems and techniques. A model event system is utilized to receive and process external events and provide instructions on how a model domain is to manage its object representations.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for the management of a model event system. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Management Model

A management model provides for uniformity in controlling and defining objects and services by providing instructions and attributes that are common to the events, applications, and objects that implement the model. The model describes how data is grouped together into objects and how the objects are related to each other. JSR-77 provides a general foundation for model management in Java but does not specifically define how these principles should be implemented. This flexibility allows for vendor specific information to be added as long as JSR-77 is fully implemented. For example, a vendor may add additional capabilities and a client that does not understand these capabilities simply ignores this additional information and only looks at the JSR-77 information that it has knowledge about.

Embodiments of an Event Management System

Figure 1A:
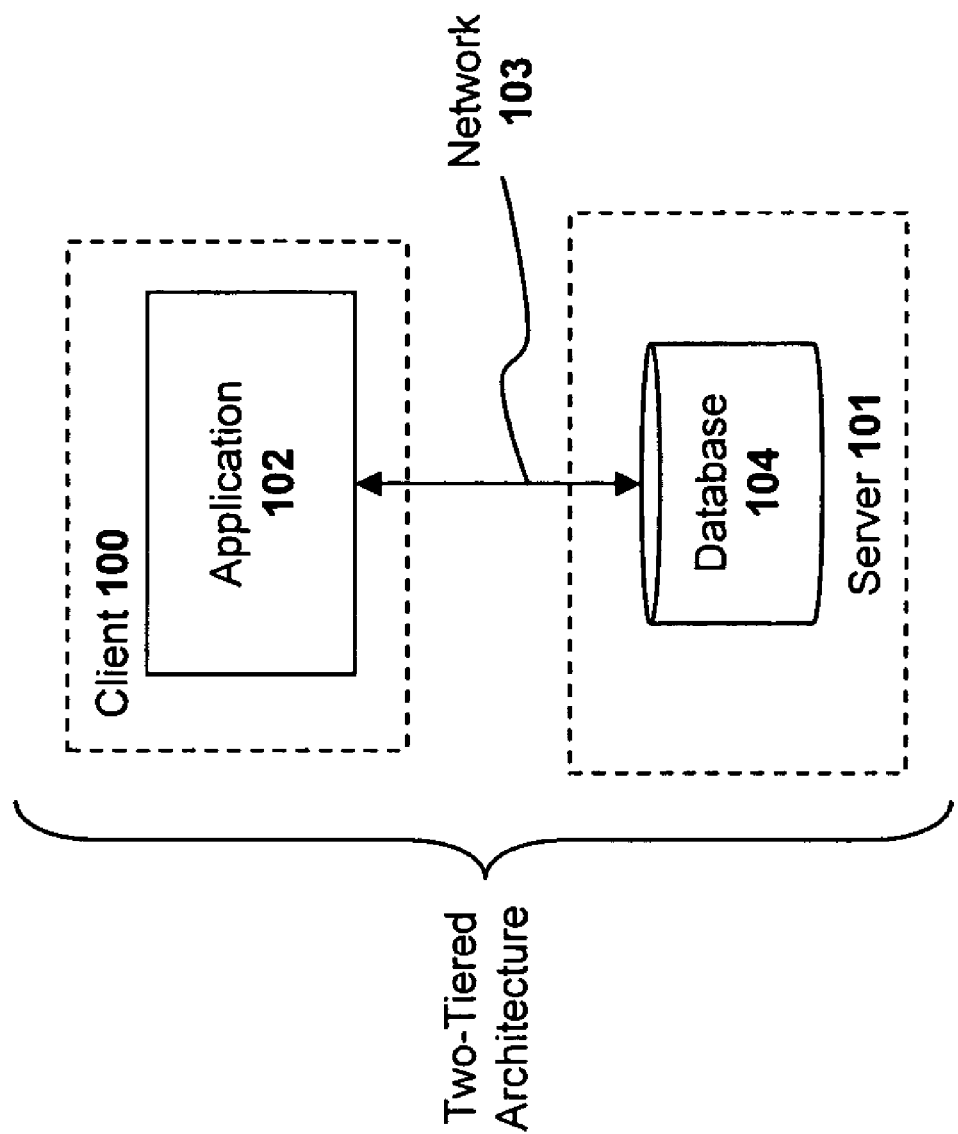
FIG. 1a illustrates a traditional two-tier client-server architecture.
Figure 1B:
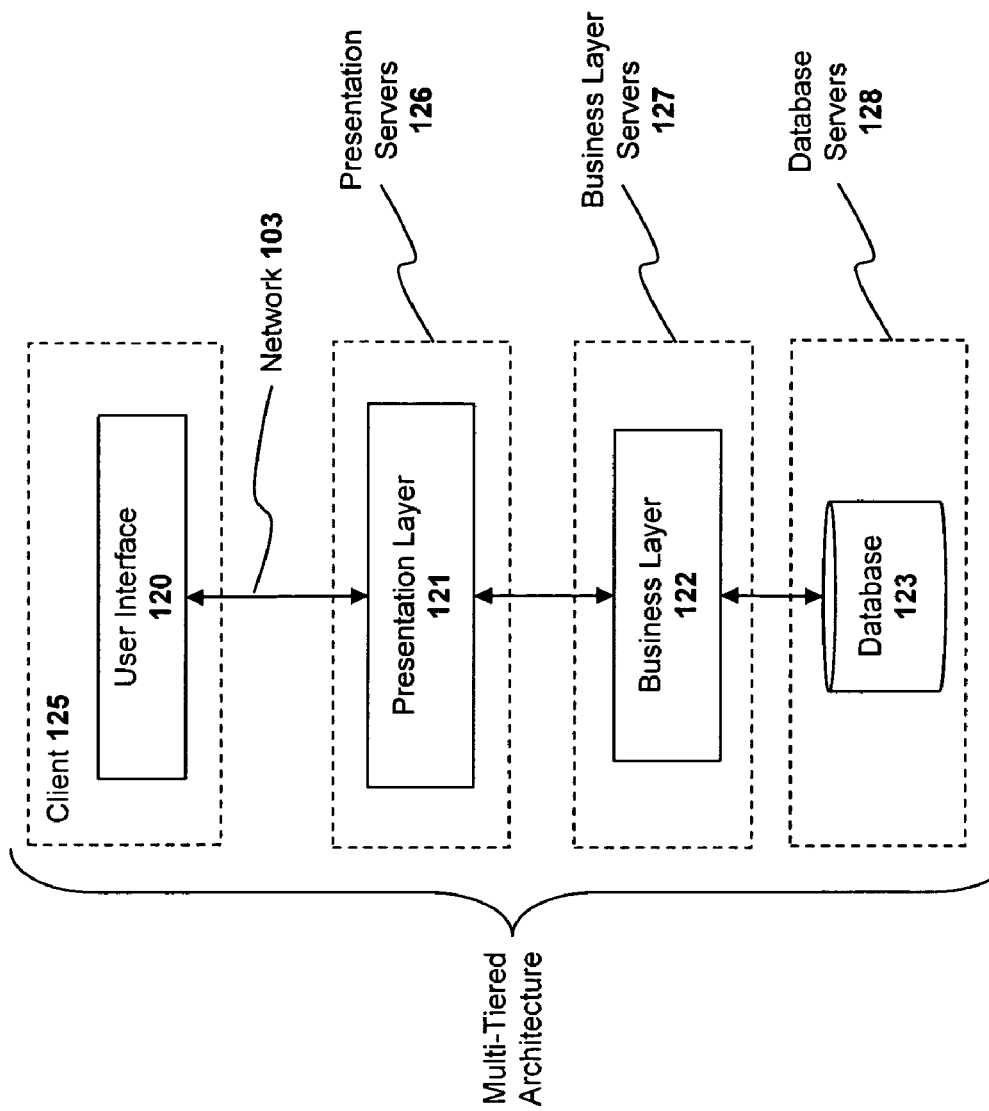
FIG. 1b illustrates a prior art multi-tier client-server architecture.
Figure 2:
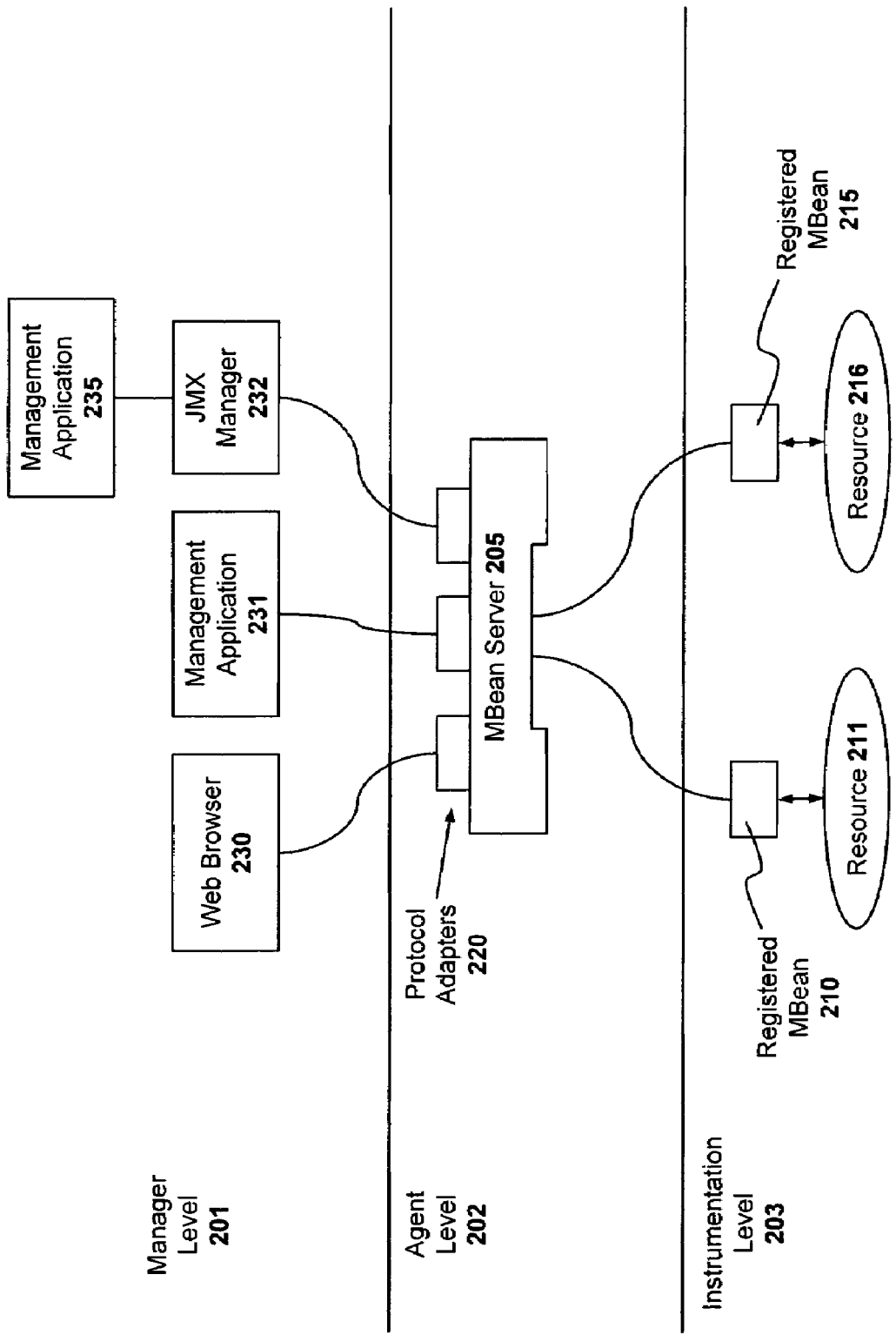
FIG. 2 illustrates the various levels of the Java Management Extensions ("JMX") architecture.
Figure 3:
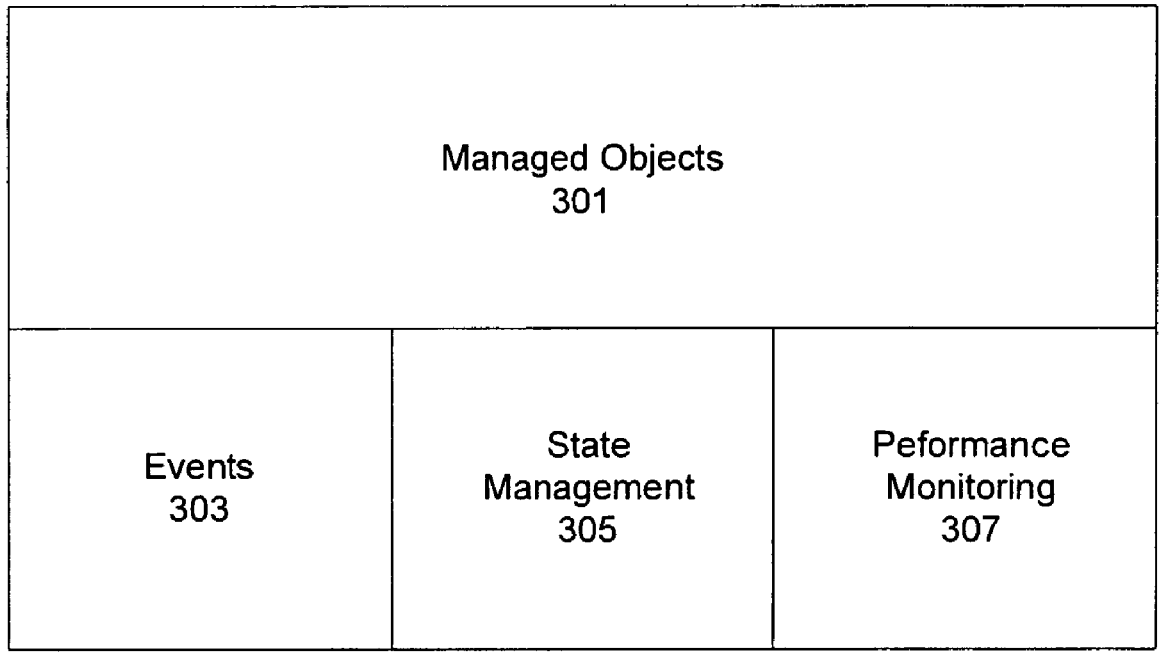
FIG. 3 illustrates the major elements of JSR-77.
Figure 4:
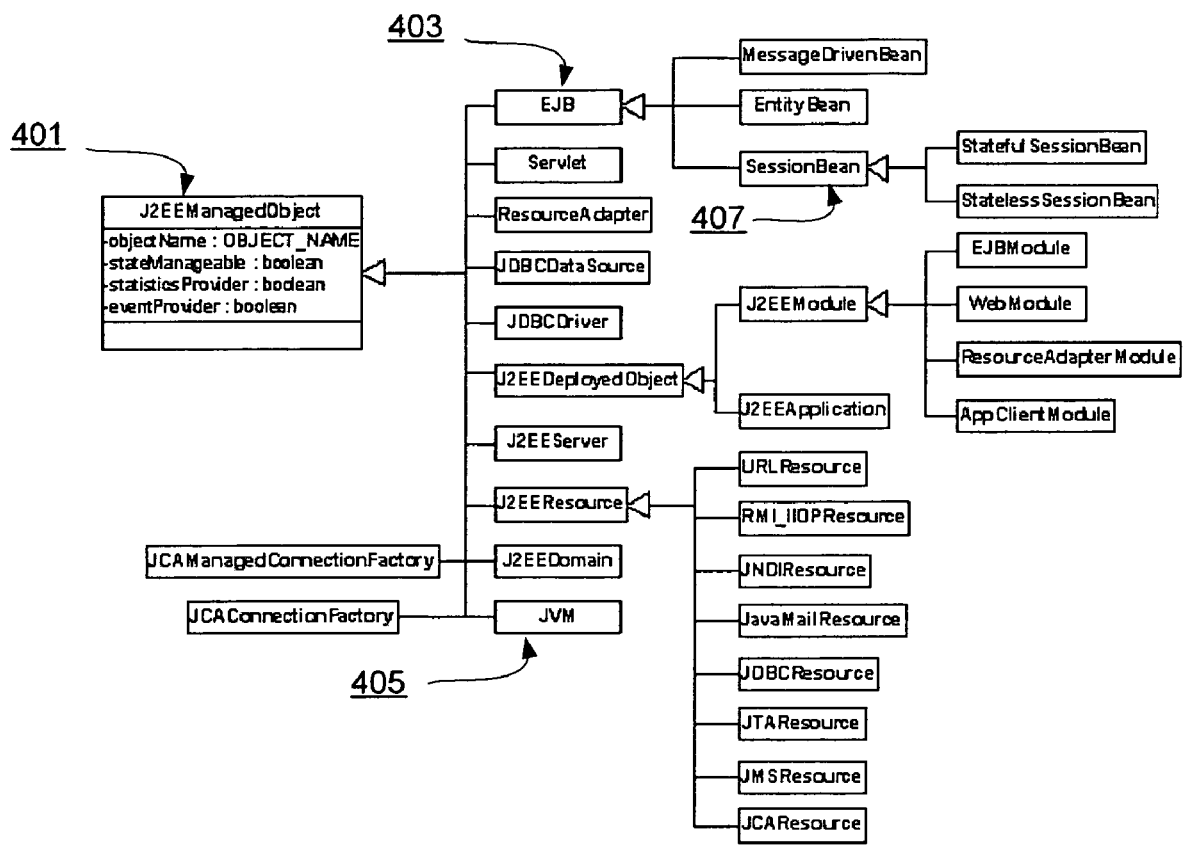
FIG. 4 illustrates the JSR-77 inheritance hierarchy as depicted.
Figure 5:
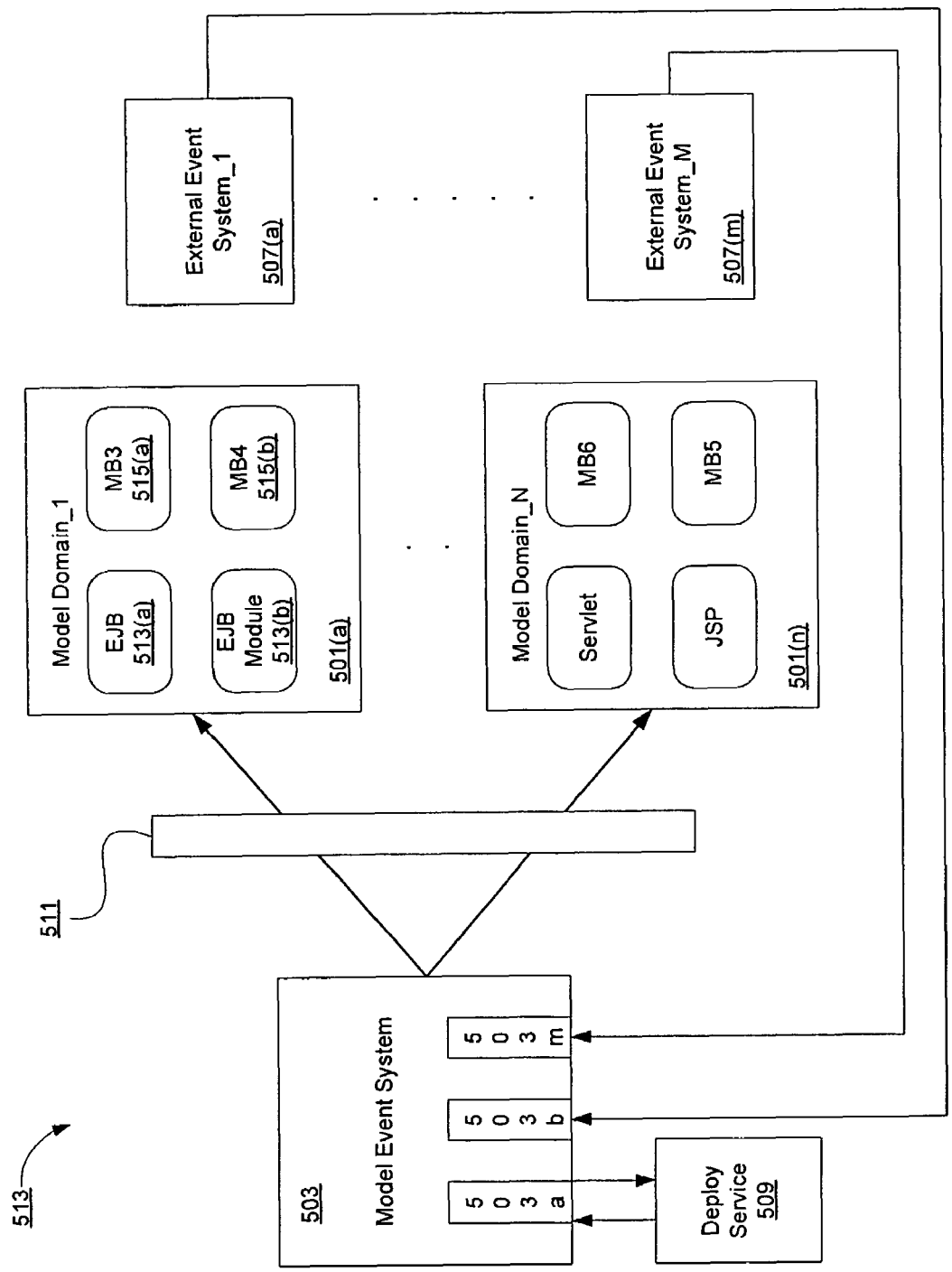
FIG. 5 illustrates one embodiment of a system to manage objects that utilizes the JSR-77 management model.

FIG. 5 depicts one embodiment of an exemplary system to manage objects that utilizes the JSR-77 management model. This system 513 includes a model event system ("MES") 503, a model domain 501(a), 501(n), and an external event system ("EES") 507(a), 507(m), each of which will be described in more detail below.

Model Domain

In one embodiment, the management model JSR-77 is effectively divided into different model domains 501(a), 501(n) each of which is managed by a separate J2EE Engine component. The library for the J2EE engine incorporates all of the JSR-77 model interfaces. In other words, each model domain is JSR-77 compliant. Additionally, a management model service interface is provided that allows the management to interact with other components. The library may also include model helper classes. Exemplary J2EE Engine components include services, containers, kernel managers, etc. Each component controls a domain which is a part of the management model. Each model domain builds and manages the management model by performing tasks including creating, destroying, and updating models.

For example, groups of objects, services, applications, etc. are grouped together to form a domain. Model domains manage these objects, services (i.e., JNDI, RMI, etc.), applications, and/or representations of objects. Exemplary objects that are managed include EJBs, connectors, servlets, modules (i.e., EJB module, etc.), JavaServer Pages ("JSP"), etc. In one embodiment, model domains do not intersect (i.e., each model domain is maintained separately and domains do not need to know about each other's maintenance). Model domains may call each other.

In one embodiment, model domains only manage a representation of MBean object associated with an object, application, or service of the model domain. For example, in model domain_1 501(a), the associated MBean representations 515(a), 515(b) of two objects 513(a), 513(b) and are managed. Model domain_1 501(a) created these representations 515(a), 515(b) and may perform the necessary tasks to manage them (i.e., update or destroy).

MBean representations of a model domain are transformable into regular MBeans. In one embodiment, these representations are passed through an MBean transformer layer and then registered with an MBean server. These representation objects are "wrapped" into MBeans using a standard MBean wrapper. Each domain registers its object representations with an MBean server. Accordingly, a model domain only has knowledge about the objects that it is responsible for including those registered with the MBean server and updates the models of those objects when necessary.

External Event System

An external event system 507(a), 507(m) is an event based system which issues notifications ("external events") that the J2EE engine server has changed its state. These external event notifications are directed toward the MES 503 of the system and alert the MES 503 that a model domain needs to be updated. Typically, external event systems 507(a), 507(m) are part of a kernel manager or service. External event systems 507(a), 507(m) may also be model domains.

External events may be local or cluster wide. An event is local if it occurs on a single machine. An exemplary local event is one that occurs between two instances. A cluster wide event occurs between multiple machines. External events include starting or stopping a service, removing an application, stopping model maintenance, etc.

In one embodiment, each EES 507(a), 507(m) is accessible to a user through a graphical user interface ("GUI") or command line (not illustrated) that allows a user to deliver and generate a particular external event.

Deploy Service

The deploy service 509 provides information ("deploy events") to the MES 503 regarding applications of the system. Each deploy event identifies an application (or service) and list of containers into which the application is being deployed. Exemplary deploy events include the delivery, start, stop, remove, update, etc. of an application. The MES 503 uses this information to create a new model event and send it to the model domains that need to know about this information.

The deploy service 509 is treated as an external event system as it sends events to the MES 503. The deploy service 509 may also be considered a model domain as it may receive events from the MES 503. These labels of external event system and model domain are independent and as far as the MES 503 is concerned there is no "bridge" between these to areas. For an example, when an application is deployed the deploy service 509 sends deploy events as an EES but not as a model domain.

Model Event System

The model event system 503 decides when different parts of the model need to be updated and notifies the responsible model domain or controllers. Typically, the MES 503 is implemented as a J2EE engine service. The MES 503 breaks up the task of maintaining the overall management model into separate tasks of managing the individual model domains. These tasks include starting and stopping services and/or deploying and removing applications. Typically, model domain updates occur upon events from the deploy service and/or external event systems. For example, the MES 503 dictates when a specific model domain is to perform a task by sending notification with instructions (a "model event") to that model domain. Model events are generated by the MES 503 using information from the received external event regarding a specific model domain. In another embodiment, the MES 503 sends a model event to all of the model domains and allows each model domain to determine if it should implement the model event. The MES 503 may or may not create a model event from a received external event if the model event is not appropriate for the model domain.

The MES 503 is built on external event system and/or deploy service plug-ins 503(a), 503(b), 503(m) that accept external or deploy events, process them, and route the process to the appropriate model control. The use of plug-ins 503a, 503b, 503m allows for greater flexibility in the overall system. As new external event systems and/or model domains are introduced into the system and communicate with the MES 503, a plug-in may be adopted by the MES 503 without having to redevelop (i.e., redesign and redeploy) the MES 503 thereby making the MES 503 more easily extensible.

In one embodiment, each external event system type has a plug-in specifically designed for it. For example, plug-in 503(b) is used in connection with external events from external event system_1 507(a) and plug-in 503(m) is used in connection with external events from external event system_m 507(m) which is of a different type than external event system_1 507(a).

An event system type may have multiple plug-ins associated with it within a MES 503. For example, if external event system_1 507(a) and external event system_m 507(m) are of the same type, the MES 503 may have separate plug-ins 503(a), 503(m) associated with each event system. The use of separate plug-ins allows for multiple external events to be processed at once if the MES 503 supports such a capability.

In another embodiment, the MES 503 is built on plug-ins not specifically target to a particular external event system type. These plug-ins accept external events from any external system type and determine the appropriate action that should be taken.

In yet another embodiment, the plug-ins of the MES 503 only receive external events but do no further processing. After the external events are received they are processed by central logic within the MES 503. For example, the logic is able to process external events from all of the external event systems including creating and sending a model event to the relevant model domains.

Delivery of external events is typically performed synchronously from the external event systems to the MES 503. These events may be processed by the MES 503 synchronously or asynchronously. For example, in synchronous processing, each plug-in of the MES 503 performs the relevant operations necessary to create and distribute a model event as soon as it receives an external event. In another embodiment, a plug-in of the MES 503 prioritizes each external event received.

In one embodiment, the MES 503 uses queuing for outgoing and/or incoming messages. This may be especially beneficial in a system of limited bandwidth. The MES 503 queue prioritizes which model domain should be notified sooner. A higher priority is given to those model domains that have relatively more frequent modifications to the objects that they are responsible for. For example, if the objects of model domain_1 501(*a*) are updated more often than those of model domain_n 501(*n*) then model domain_1 501(*a*) would be given a higher priority for notification. Additionally or alternatively, a higher priority may be given to those model domains based on the type of object they are responsible for.

The MES 503 may be accessible to a user through a GUI or command line. This access allows the user to choose how to update a model without the occurrence of an external event. For example, the user may choose to reconfigure a model domain if performance in the system necessitates a change and the external event system associated with the model domain is not causing that change to occur.

Model Domain Interface

In one embodiment, model domains wishing to receive model events implement a model domain interface 511. This model domain interface 511 provides for the creation and destruction of a particular model. Additionally, a model is updatable on the basis of a model event. An exemplary interface is defined below:

```
public interface ModelDomain {
    public void createModel( );      // throws ModelException
    public void destroyModel( );     // throws ModelException
    public void updateModel(ModelEvent me); // throws ModelException
}
```

Model events sent from the MES 503 travel through the model domain interface 511 to the relevant model domains where they are implemented. The MES 503 contains a list of all model domains in the system and the relevant objects and representations that they manage. From this list, the MES 503 or plug-ins of the MES 503 determine which model domains should receive which model event.

Plug-in

Figure 6:
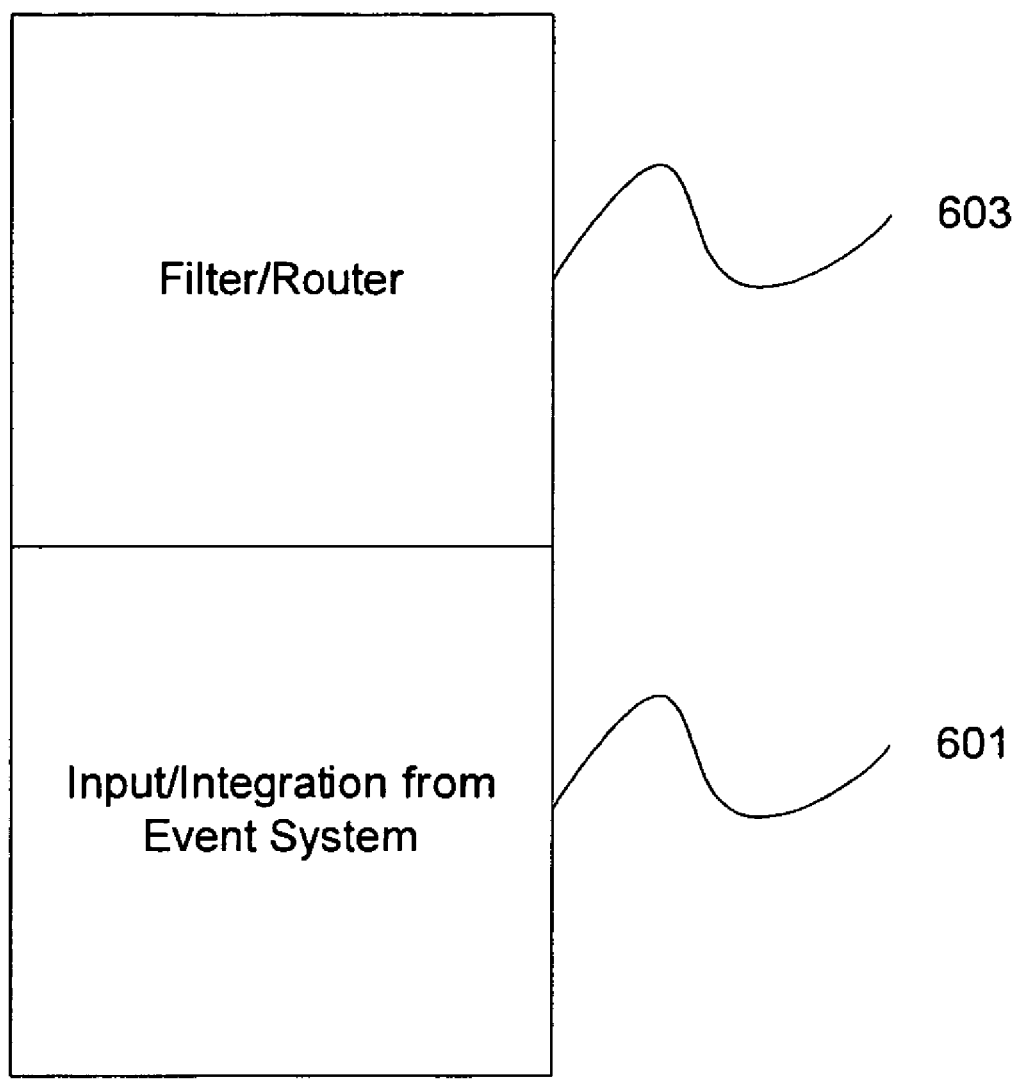
FIG. 6 illustrates a plug-in according to one embodiment of the invention.

FIG. 6 illustrates a plug-in according to one embodiment of the invention. The plug-in includes a filter 603 and an integration component 601. The integration component 601 receives external/deploy events. Integration also includes instructions to process specific external events and generate model events for the model domains.

The instructions of a plug-in may differ if the plug-in is designed for a specific external events system. However, it is possible that external event systems overlap and those instructions associated with the overlap are the same. In one embodiment, this component 601 includes a queue to allow for the storage of external events that have not yet been processed.

The filter 603 provides for routing of the model events generated by the integration component 601. The filter 603 may include a table of model domains and their respective characteristics. Using this table the filter 603 determines what model domain the model event should be associated with by comparing the model event with the characteristics stored in the table.

Exemplary Operation

Figure 7:
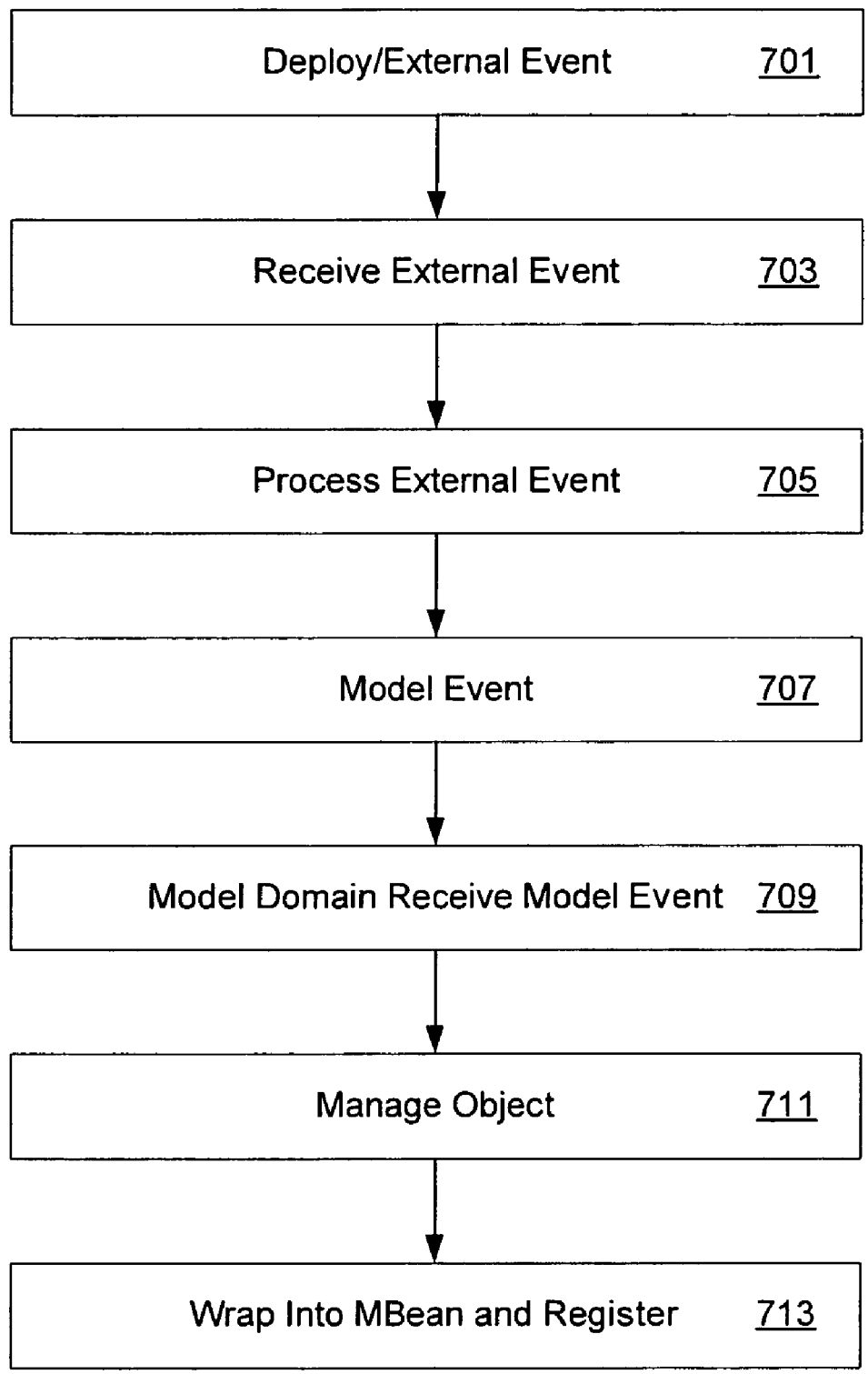
FIG. 7 illustrates a flow chart of exemplary operations of the system.

FIG. 7 illustrates a flow chart of exemplary operations of the system. An external or deployment event occurs and sent to the MES 503 from an external event system 507(*a*), 507(*m*) or deployment service 509 at block 701. Exemplary events have already been discussed. A plug-in of the MES 503 receives the external event at 703. In one embodiment, the MES 503 is capable of receiving multiple external events at a time if the events are directed to different plug-ins. For example, the plug-in associated with a first external system and the plug-in associated with second external system may receive an event simultaneously.

Once an external event is received 703, the plug-in processes the external event 705. Processing includes creating a model event and determining which model domain will receive that event based on the information contained in the external event. At 707 the model event is distributed to the relevant model domain. In one embodiment, if more than one model domain needs to be notified only one event to the model domain interface and the model domain interface distributes the model event to the appropriate model domains. In alternative embodiment, the model event is delivered as many times as model domains that need to be notified. In other words, each model domain receives its own, independent model event.

At 709 the model event is received by a model domain. In one embodiment, the model domain that receives the model event notifies the model event system that a successful transmission has occurred. This allows the model event system to re-send a model event if it does not receive a response from a model domain that it sent a model event to. The model event system may track which domains by keeping a table of the message sent and to whom.

The model domain processes the model event and manages the relevant MBean representation at 711. This could include creating, deleting, or modifying an MBean representation. If the model domain that has received the model event is also an external event system, it updates its model according to the model event rather than assumed knowledge of what the source event means for its model.

At 713 the model domain communicates with the MBean server. If an MBean representation was created, this representation is wrapped into an MBean and registered with the MBean server. If an existing MBean representation is modified or deleted this change is reported to the MBean server.

For example, in one embodiment of modification, the modified MBean representation is wrapped into new MBean and registered with an MBean server. The MBean server is also served notice that the previously registered MBean is not longer valid. In another embodiment of modification, the existing MBean is accessed by the model domain and is re-wrapped with the new information.

An Embodiment of Client Access

Clients will not typically directly access an individual model domain to make desired changes to a managed object representation or retrieve data about that object. Under JSR-77 this information is available through the MBean based on that object. Thus, a client may utilize the JMX principles to access the information of the management system. For example, a user may use the management application 231 to connect to the MBean server 205 and retrieve the registered MBean.

Dynamic Relation Attributes

An MBean registered in an MBean Server is seen by its client through its MBean interface. Operations and properties of this interface however obey certain rules. One of these rules is that the return type of all properties and operations is either a primitive type or a serializable type. This means that if a relation between two MBeans should be implemented it cannot be done as a simple Java reference from a first MBean to second MBean.

The JMX specification allows for every MBean to have an object name and the relationship between MBeans is implemented by these object names. Using JMX object names allow for a client who already has a reference to particular MBean to locate its related MBeans. In one embodiment, the is performed by calling get related MBeans function and performing a query against the MBean server to acquire reference to MBeans of certain type for every object name in the returned by the get related MBeans function.

A JSR-77 object name contains a lot of information. Primarily this information covers the cluster node, the java virtual machine, the application with which the object being managed was deployed, the J2EE application module, etc. In one embodiment, this information is exploited to provide for optimization regarding relations and naming. Only a portion of an object name from a managed object is necessary for an object name generated. In particular what is hidden from MBean developer is information like cluster node, java virtual machine name, etc., because these are constants for a given cluster node and are easily known by the wrapper layer. This is done only to alleviate developers of managed object from the task to tackle with whole object names. A partial object name is complemented to a full object name containing all the information as mandated by JSR-77 only after it is wrapped into a real MBean.

In one embodiment, these relation attributes are implemented dynamically using helper classes which execute queries in the MBean server. For example, accessing the modules attribute of a J2EE managed object will invoke a helper class to obtain the ObjectNames of its modules.

As relation attributes in JSR-77 are of type OBJECT_NAME which is a string representation of the javax.management.ObjectName, when the client accesses an MBean through the MBean server typically the client has to build temporary ObjectName objects from these strings or get the string representations from the ObjectName objects. This increases memory consumption and reduces performance. A further optimization of client access is to duplicate these strings with ObjectName attributes so that all of these temporary instances do not need to be created.

Embodiments of the invention may include various steps as set forth above. The steps may be embodied in machine-executable instructions which cause a general-purpose or special-purpose machine, such as a computer processor or virtual machine, to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

A high-level language virtual machine (e.g., a Java Virtual Machine, a Parrot virtual machine, etc.) or interpreter (e.g., Common Language Runtime ("CLR")) runs as an application program on top of a computer operating system and converts source code from a high-level language (e.g., Java, C#, VB.NET, Python, C, C++, J#, APL, etc.) into an intermediate form (e.g., Java byte code, Microsoft Intermediate Language, etc.). This intermediate form is then converted to machine level code by compiling the intermediate code at run-time (e.g. JIT compiler), interpreting the intermediate code, or a combination of both. The end result is machine level code that is understandable to a specific processor(s) of a processing core of a computer(s).

The use of a virtual machine or an interpreter allows a developer to write computer programs that run independently of platforms, languages, and hardware. For example, any program developed under the J2EE standard can run on any computer where a corresponding Java Virtual Machine is installed and any .NET program may run on any computer with .NET installed.

There are many different implementations of the Java Virtual Machine (e.g. those offered by Sun, Oracle, BEA, IBM, SAP, and etc.) and interpreters (e.g., those offered through .NET, Mono, dotGNU, etc.), however these different implementations work in the same general fashion as discussed above. It is believed that processes taught by the discussion above can be practiced within these various software environments.

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments of the invention described above focus on the Java environment, the underlying principles of the invention may be employed in virtually any environment in which objects are managed. These environments include, but are not limited to J2EE, the Microsoft NET framework, and the Advanced Business Application Programming ("ABAP") standard developed by SAP AG.

Accordingly, the scope and spirit of the invention should be judged in terms of the claims which follow.

What is claimed is:

1. A management system for managing object representations, the management system comprising:
a processor; and
a memory coupled to the processor, the memory to store instructions which when executed by the processor provide:
a plurality of model domains to manage the object representations, wherein each model domain is complaint with a Java Specification Request management model;
an external event system (EES) to generate a notification of a state change of a system external to the management system, wherein the notification indicates the model domain is to be updated, and
a model event system (MES) to receive the notification of a state change from the EES and transmit an instruction to a model domain of the plurality of model domains to manage the object representation based on the notification sent by the EES, wherein the MES includes plug-ins to receive the notification of a state change from the EES and to determine and generate the instruction for the model domain, wherein each plug-in comprises:
an integration component to receive the notification of a state change from the EES and to generate the instruction; and
a filter component to route the instruction created by the integration component to the model domain.

2. The management system as in claim 1, further comprising:
a deploy service communicatively coupled to the MES, wherein the deploy service generates a deploy event to identify an application being deployed in the management system and provide a list of containers into which the application is being deployed.

3. The management system as in claim 2, wherein the Java Specification Request management model is JSR-77 compliant.

4. The management system as in claim 3, wherein the Java Specification Request management model is a J2EE Engine component.

5. The management system as in claim 3, wherein the model domain implements a model domain interface.

6. The management system as in claim 5, wherein to manage an object representation the model domain wraps the object representation into a management bean (MBean).

7. The management system as in claim 6, further comprising an MBean server to register the MBean wrapped by the model domain.

8. The management system as in claim 3, wherein the EES is a part of a kernel manager.

9. The management system as in claim 8, wherein the EES is a model domain.

10. A computer-implemented method for managing object representations, the computer-implemented method comprising:
receiving an external event from an external system, wherein the external event is a notification of a state change;
creating a model event in a model event system based on the external event received by the model event system, wherein the model event provides management information pertaining to an object representation to a model domain of a plurality of model domains, wherein each model domain is complaint with a Java Specification Request management model, wherein the external event is received into the model event system via an external system plug-in adapted to the external system from which the external event is received, and the external system plug-in comprises:
an integration component to receive the notification of a state change from the external system and to generate an instruction; and
a filter component to route the instruction created by the integration component to the model domain; and
transmitting the model event from the model event system to the model domain.

11. The computer-implemented method as in claim 10, further comprising:
receiving a deploy service event from a deploy service, wherein the model event system receives the external event; and
generating a model event for the model domain for an action to be taken based on the deploy service event.

12. The computer-implemented method as in claim 10, wherein managing the object representation comprises operations selected from the group consisting of:
creating the object representation;
deleting the object representation; and
modifying the object representation.

13. The computer-implemented method as in claim 12, wherein managing the object representation further comprises operations selected from the group consisting of:
wrapping the object representation into a management bean (MBean); and
registering the MBean with an MBean server.

14. A machine-readable storage medium including program code which, when executed by a machine, causes the machine to perform the operations of:
receiving an external event from an external system, wherein the external event is a notification of a state change;
creating a model event in a model event system based on the external event received by the model event system, wherein the model event provide management information pertaining to an object representation to a model domain of a plurality of model domains, wherein each model domain is complaint with a Java Specification Request management model, wherein the external event is received into the model event system via an external system plug-in adapted to the external system from which the external event is received, and wherein the external system plug-in comprises:
an integration component to receive the notification of a state change from the external system and to generate an instruction; and
a filter component to route the instruction created by the integration component to the model domain, and
transmitting the model event from the model event system to the model domain.

15. The machine-readable storage medium as in claim 14, wherein creating a model event based on the external event further comprises:
receiving a deploy service event from a deploy service, wherein the model event system receives the external event; and
generating an model event for the model domain for an action to be taken based on the deploy service event.

* * * * *